(12) United States Patent
Tennant

(10) Patent No.: US 10,505,632 B1
(45) Date of Patent: Dec. 10, 2019

(54) FIBER BUS EXTENDER EMBEDMENT

(71) Applicant: PRECISION OPTICAL TRANSCEIVERS INC., Rochester, NY (US)

(72) Inventor: Bryce Tennant, Rochester, NY (US)

(73) Assignee: Precision Optical Transceivers Inc., Rochester, NY (US)

( * ) Notice: Subject to any disclaimer, the term of this patent is extended or adjusted under 35 U.S.C. 154(b) by 0 days.

(21) Appl. No.: 16/042,641

(22) Filed: Jul. 23, 2018

(51) Int. Cl.
H04B 10/00 (2013.01)
H04B 10/25 (2013.01)
H04B 10/27 (2013.01)
H04B 10/69 (2013.01)
H04B 10/516 (2013.01)

(52) U.S. Cl.
CPC ......... *H04B 10/2504* (2013.01); *H04B 10/27* (2013.01); *H04B 10/516* (2013.01); *H04B 10/69* (2013.01)

(58) Field of Classification Search
CPC .. H04B 10/2504; H04B 10/27; H04B 10/516; H04B 10/69; H04B 10/25753; H04B 10/2503; H04B 10/25759; H04B 10/2575; H04B 10/25751; H04B 10/504; H04B 10/40; H04B 10/505; H04B 10/29; H04B 10/808; H04Q 2011/0015; G02B 6/4284; G02B 6/4293; H04J 14/02
USPC ... 398/135, 139, 142, 115, 116, 117, 79, 97, 398/68
See application file for complete search history.

(56) References Cited

U.S. PATENT DOCUMENTS

| | | | |
|---|---|---|---|
| 4,739,334 A | 4/1988 | Soref | |
| 4,885,589 A * | 12/1989 | Edward | G01S 7/003 342/175 |
| 5,117,239 A | 5/1992 | Riza | |
| 5,333,000 A | 7/1994 | Hietala et al. | |
| 5,751,242 A * | 5/1998 | Goutzoulis | G01S 7/032 342/157 |

(Continued)

OTHER PUBLICATIONS

Longbrake, M., "True Time-Delay Beamsteering for Radar," Wright State University, Air Force Research Laboratory Sensors Directorate, Dayton, OH, 2012 IEEE National Aerospaceand Electronics Conference (NAECON), Jul. 2012.

(Continued)

*Primary Examiner* — Hibret A Woldekidan
(74) *Attorney, Agent, or Firm* — Fox Rothschild LLP; Robert J. Sacco

(57) ABSTRACT

Extending a communication distance range of an electronic data interface involves establishing a data communicating link between a first and second electronic device in accordance which communicate in accordance with a predetermined electronic interface standard (PEIS). An optical fiber bus extender embedment (FBEE) disposed intermediate of the first and second electronic device includes first and second transport modules, respectively disposed proximate to the first and second electronic devices. These transport modules interface the FBEE directly with both of the first and second electronic device in accordance with the PEIS. Electronic data signals received from the first electronic device are used to modulate a first optical signal so as to form a first modulated optical data signal (MODS). The first MODS is coupled to an optical fiber to communicate the first MODS to the second transport module.

19 Claims, 5 Drawing Sheets

(56) References Cited

U.S. PATENT DOCUMENTS

| | | | |
|---|---|---|---|
| 5,867,295 | A | 2/1999 | Betts |
| 6,229,482 | B1 | 5/2001 | Vaughan |
| 6,836,515 | B1* | 12/2004 | Kay .................. H04B 1/406 |
| | | | 375/260 |
| 7,446,696 | B2 | 11/2008 | Kondo et al. |
| 7,545,868 | B2 | 6/2009 | Kennedy et al. |
| 7,724,179 | B2 | 5/2010 | Williams et al. |
| 8,180,183 | B1 | 5/2012 | Yap |
| 9,070,972 | B2 | 6/2015 | Wang et al. |
| 9,525,489 | B2 | 12/2016 | Schuetz et al. |
| 9,614,280 | B2 | 4/2017 | Shi et al. |
| 9,831,901 | B2 | 11/2017 | Kpodzo et al. |
| 10,103,823 | B1 | 10/2018 | Kyrolainen et al. |
| 10,312,999 | B2 | 6/2019 | Neuman |
| 2003/0090777 | A1 | 5/2003 | Yap |
| 2004/0208636 | A1 | 10/2004 | Reynolds et al. |
| 2006/0067709 | A1 | 3/2006 | Newberg et al. |
| 2007/0280704 | A1 | 12/2007 | Fitzgerald et al. |
| 2008/0225375 | A1 | 9/2008 | Newberg et al. |
| 2009/0067772 | A1 | 3/2009 | Khurgin et al. |
| 2009/0110398 | A1* | 4/2009 | Pfeiffer ................. H04B 10/27 |
| | | | 398/63 |
| 2009/0263144 | A1 | 10/2009 | McKinney |
| 2011/0038632 | A1* | 2/2011 | Zou ....................... H04B 10/27 |
| | | | 398/72 |
| 2012/0070151 | A1* | 3/2012 | Shin .................. H04B 10/5053 |
| | | | 398/102 |
| 2012/0189308 | A1 | 7/2012 | Watanabe |
| 2013/0202308 | A1 | 8/2013 | Middleton et al. |
| 2014/0126914 | A1* | 5/2014 | Berlin ............. H04B 10/25753 |
| | | | 398/116 |
| 2015/0349892 | A1 | 12/2015 | Fischer et al. |
| 2017/0207531 | A1 | 7/2017 | Murakowski |
| 2018/0091335 | A1* | 3/2018 | Schnizler ............ H04L 25/4917 |
| 2018/0102847 | A1 | 4/2018 | Kim et al. |
| 2019/0212472 | A1* | 7/2019 | Tennant ................. G02B 1/005 |
| 2019/0222320 | A1 | 7/2019 | Calhoun et al. |

OTHER PUBLICATIONS

Righini, G.C., et al., "Glass Optical Waveguides: A Review of Fabrication Techniques," Optical Engineering 53(7), 071819 (Jul. 2014).

Chang, Chia-Ming, et al., "High-power dual-fed traveling wave photodetector circuits in silicon photonics," Aug. 24, 2015, vol. 23, No. 17, DOI: 10.1364/OE.23.022857, Optics Express 22857.

Beling, A., et al., "InP-based waveguide photodiodes heterogeneously integrated on silicon-on-insulator for photonic microwave generation," Nov. 4, 2013, vol. 21, No. 22, DOI: 10.1364/OE.21.025901, Optics Express 25901.

* cited by examiner

FIBER BUS EXTENDER EMBEDMENT

BACKGROUND

Statement of the Technical Field

The technical field of this disclosure comprises electronic systems, and more particularly electrical interfaces for electronic systems.

Description of the Related Art

Electrical interfaces are commonly used for communication of data between a master device (such as a microprocessor or microcontroller) and various peripheral devices which operate under the control of the master device. Examples of conventional electrical interfaces which can be used for this purpose include the Inter-Integrated Circuit (I2C) interface, Serial Peripheral Interface (SPI), RS232, and the Universal Serial Bus (USB). Many microcontrollers also provide a General Purpose Input/Output (GPIO) interface. These GPIO interfaces generally include one or more pins which can be programmed to either accept inputs or provide outputs to external devices. For example, some microcontrollers include groups of eight pins which can be configured for communicating data. The behavior of these pins can be programmed by means of software.

The various types of electrical interface have various advantages and disadvantages. In general, however, such moderate to high speed electrical interfaces are limited in trace or cable length due to the dispersion and attenuation characteristics of copper traces or conductors used to communicate the electrical signals. For example, I2C and SPI are each designed to operate over relatively short distances (e.g., within the same printed circuit board). USB and RS232 can facilitate somewhat longer distances. For example, USB can be used over distances up to about 5 meters and RS232 can facilitate baud rates up to 9600 at distances up to about 15 meters. GPIO is similarly limited with regard to the distance that can be tolerated between a sending device and a receiving device.

A conventional solution to the foregoing problem involves the use of Ethernet framed applications. But these approaches are not entirely satisfactory because they require substantial amounts of processing power. Such processing is needed to collect information at high levels of a microprocessor protocol stack and to then push the information down to physical layers. The substantial amounts of processing required to facilitate these operations means that these systems are often not suitable for real-time communications between a microprocessor or microcontroller and one or more slave devices. In particular, such communication methods tend to have both high latency and high timing variance.

SUMMARY

This document concerns a method and system for extending a communication distance range of an electronic data interface. More particularly, the method involves establishing a data communicating link between a first electronic device and a second electronic device in accordance with a predetermined electronic interface standard (PEIS). In some scenarios, the PEIS can be selected from the group consisting of Inter-Integrated Circuit (I2C) interface, Serial Peripheral Interface (SPI), and a GPIO interface, among others. A usable distance of the data communication link is extended by interposing an optical fiber bus extender embedment (FBEE). The optical FBEE is disposed at an embedment location along a data communication path of the data communication link, intermediate of the first and second electronic device. Thereafter, a first and second transport module, respectively disposed proximate to the first and second electronic device are used to interface the FBEE directly with both of the first and second electronic device in accordance with the PEIS. At the first transport module, a first electronic data signal received from the first electronic device is used to modulate a first optical signal so as to form a first modulated optical data signal (MODS). The first MODS is coupled to an optical fiber to communicate the first MODS to the second transport module.

The first MODS is demodulated at the second transport module to recover the first electronic data signal, and the first electronic data signal which has been recovered is communicated to the second electronic device. The first electronic data signal which has been recovered is communicated to the second electronic device in accordance with the PEIS.

At the second transport module, a second electronic data signal received from the second electronic device can be used to modulate a second optical signal so as to form a second MODS. The second MODS can be coupled to a second optical fiber to communicate the second MODS to the first transport module. The second MODS is demodulated at the first transport module to recover the second electronic data signal. The second electronic data signal which has been recovered is then communicated to the first electronic device in accordance with the PEIS. The first and second optical fibers can be the same or distinct and separate optical fibers.

The method can further involve establishing a second data communicating link between a third electronic device and a fourth electronic device in accordance with a second PEIS. These third and fourth electronic devices can be respectively disposed proximate to the first and second transport module. At the first transport module, a second electronic data signal received from the third electronic device is used to modulate a second optical signal so as to form a second modulated optical data signal (MODS). Finally, the second MODS is optically multiplexed with the first MODS on the optical fiber to facilitate communicating the second MODS to the second transport module. The second MODS can be de-multiplexed and demodulated at the second transport module to recover the second electronic data signal.

The solution can also involve a physically distributed system. In the physically distributed system, a first electronic device and a second electronic device are configured to communicate with each other over a data communication link. The system can be configured such that the communications are performed in accordance with a PEIS. The system also includes a fiber bus extender embedment (FBEE). The FBEE, which is configured to extend a usable distance of the data communication link, can include a first and a second transport module which are respectively disposed proximate to the first and second electronic device. As such, the first and second transport modules can be configured to interface the FBEE directly with both of the first and second electronic device in accordance with the PEIS. The first transport module in the above-described system is configured to receive a first electronic data signal from the first electronic device, and modulate same so as to form a first modulated optical data signal (MODS). It is further configured to couple the first MODS to an optical fiber to communicate the first MODS to the second transport module.

In the physically distributed system described herein, the second transport module is configured to demodulate the first MODS to recover the first electronic data signal. The second transport module is also configured to communicate the first electronic data signal which has been recovered to the second electronic device. More particularly, the second transport module is configured to communicate the first electronic data signal which has been recovered to the second electronic device in accordance with the PEIS.

The second transport module can be further configured to use a second electronic data signal received from the second electronic device to modulate a second optical signal so as to form a second MODS. The second transport module is configured to couple the second MODS to a second optical fiber to communicate the second MODS to the first transport module. The first transport module is configured to demodulate the second MODS to recover the second electronic data signal, and communicate the second electronic data signal which has been recovered to the first electronic device in accordance with the PEIS. The first and second optical fibers can be the same or can be separate optical fibers.

BRIEF DESCRIPTION OF THE DRAWINGS

This disclosure is facilitated by reference to the following drawing figures, in which like numerals represent like items throughout the figures, and in which.

DETAILED DESCRIPTION

Figure 1:
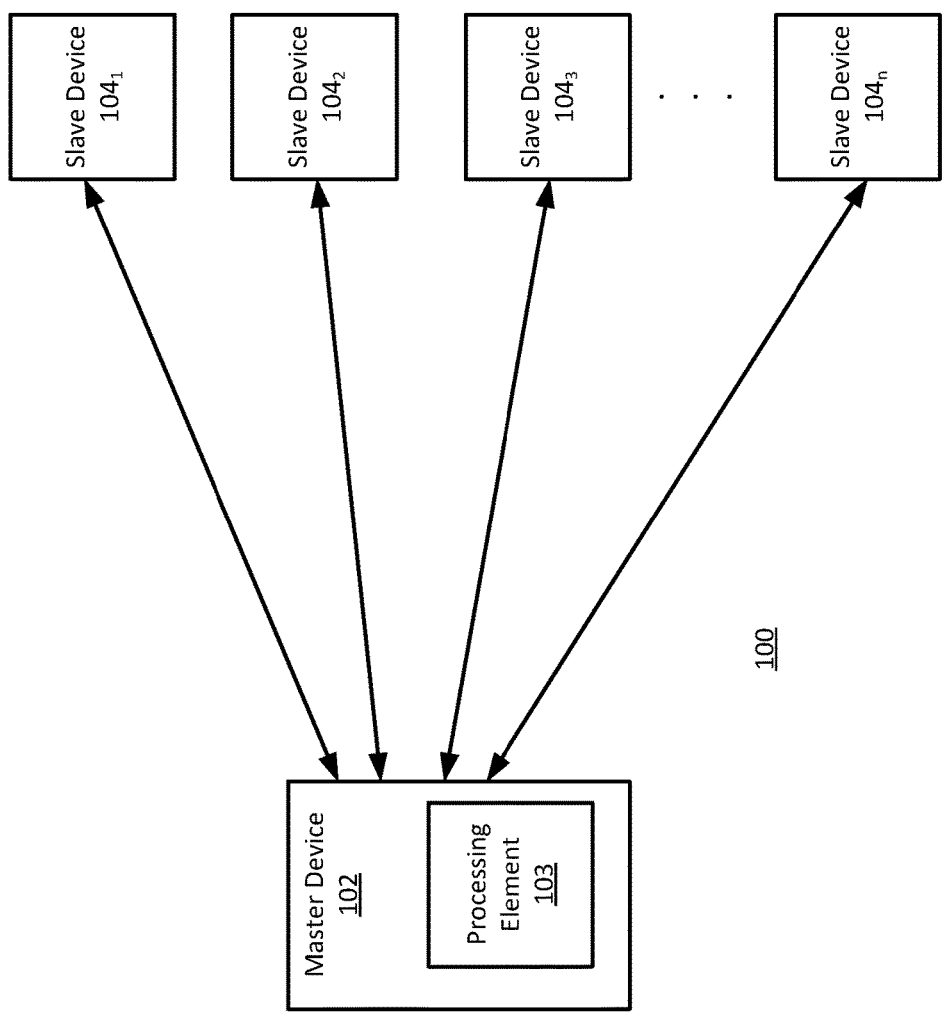
FIG. 1 is a block diagram that is useful for understanding a distributed electronic system.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Moderate to high speed electrical interfaces are very much limited in trace or cable length due to the dispersion and attenuation characteristics of copper traces. This implies that many electronic systems utilizing such electrical interfaces (whether for digital or analog signals) are limited in their geometry or physical architecture. What is lacking is a quasi-real-time minimal cost hardware solution for a moderate to high speed electronic interface which is suitable to facilitate communications between a master device (such as a microcontroller or microprocessor) and an associated networks of slave devices. All such conventional solutions (e.g., solutions involving the use of Ethernet framed applications) require a remote microprocessor with associated software and/or a remote field programmable gate array (FPGA) to facilitate such communications operations. These conventional approaches are not satisfactory because they increase the cost of the so-called slave devices and result in significantly higher levels of power consumption.

Accordingly, there is presented herein a solution to the foregoing problem that is low in cost and easy to deploy. The solution facilitates remote control of various slave devices by a processor or microcontroller, using standard communication protocols and minimal support circuity. Further, slave devices configured for different interface standards (e.g., SPI, I2C, GPIO and so on) can be accommodated. In the proposed system, remote systems will appear local to head end (master device) and multiple remote systems or slave devices can be controlled from a single head end. Notably, the solution facilitates systems in which there is a substantial distance between a master device and remote slave elements (e.g. distances of 1 kilometer or more). Further, large communication bandwidths are supported over the interface, thereby facilitating operations involving a relatively large number of remote systems.

Referring now to FIG. 1 it can be observed that an electronic system 100 can comprise a master device 102 and one or more slave devices $104_1$, $104_2$, . . . $104_n$. In some scenarios, the slave devices may be independent devices and/or may be separated by some distance from each other. However, in other scenarios, two or more of the subsystems $104_1$-$104_n$ can be located in close proximity to each other. For example, the slave devices $104_1$-$104_n$ can together comprise components of a remote subsystem.

In a system as shown in FIG. 1 the master device 102 will commonly include a processing element 103, such as a microprocessor, microcontroller, application specific integrated circuit (ASIC). In some scenarios, the processing element performs operations to facilitate monitoring and/or control operations with respect to the one or more slave devices. In the slave devices $104_1$-$104_n$ a processor element may be present. But in many scenarios, cost and/or design constraints may be such that one or more of these slave devices can lack the presence of any type of processor element.

In order for a system 100 to function properly, a communication interface is often required to facilitate moderate to high-speed data communications in real time with little or no latency and/or timing variance. Conventional systems can utilize a common electrical interface standard such as I2C, SPI or GPIO, to facilitate such moderate to high-speed data communications. For example, I2C can provide a maximum throughput of 3.5 Mbps (when operated in its high-speed mode) and common bus speeds for SPI can be in the range of 1-100 Mbps. These types of interfaces are well-known in the art and can function well over relatively short distances.

But in some scenarios, it may be desirable to position one or more of the slave devices $104_1$-$104_n$ at a substantial distance from the master device 102. For example, it can be desirable to provide a remote subsystem comprised of one or more slave devices at a location which is a distance from the master. Under such circumstances, implementation of an electrical interface can be quite challenging where the distance between the master and slave device is more than about 3 meters. This is due to various factors including the requirement of minimal latency and/or timing variance, dispersion and attenuation characteristics of copper traces, and the lack of any substantial processing capability at many slave devices $104_1$-$104_n$. The problem can be complicated further by the fact that within the same electronic system 100, some slave devices $104_1$-$104_n$ may be configured with different types of conventional electronic interfaces (e.g. I2C, SPI or GPIO) as compared to other slave devices $104_1$-$104_n$.

Figure 2:
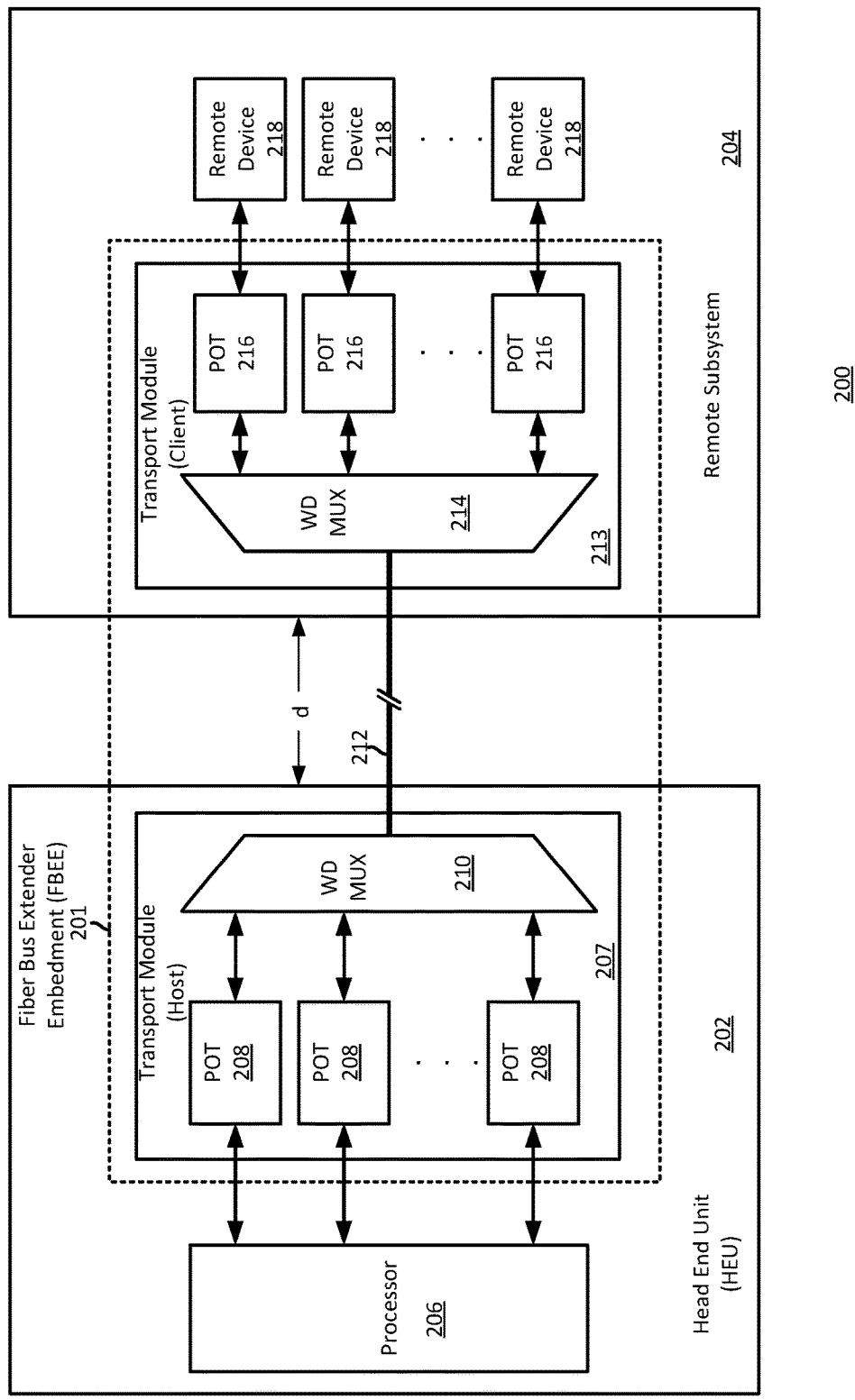
FIG. 2 is a block diagram that is useful for understanding a fiber bus extender embedment (FBEE) in a distributed electronic system.

Turning now to FIG. 2, there is shown a block diagram that is useful for understanding a method and system whereby a moderate to high speed data communication interface can be provided between a master device 102 and one or more remote devices $104_1$-$104_n$. The disclosed arrangements facilitate data rates between 1-100 Mbps or more and interface distances ranging from 1 meter to 1000 meters or more.

In FIG. 2, an electronic system 200 is comprised of a head end unit (HEU) 202 and a remote subsystem 204. The remote subsystem includes a plurality of remote devices 218 which are monitored and/or controlled by a processor 206 in the HEU. For purposes of the present discussion, the exact nature of the processor 206 is not critical. For example, the processor 206 can be a microprocessor, a microcontroller, and or an ASIC. Each of the remote devices 218 can be configured to communicate with a control device (such as processor 206) using a conventional electronic interface standard. Examples of such conventional electronic interface standards which may be used for this purpose include I2C, SPI and/or GPIO. Of course, other interface standards whether now known, or known in the future can also be used. Remote subsystem 204 in this scenario can be located a substantial distance d from the HEU. For example, the remote subsystem may be between 1 meter to 1000 meters or more from the HEU.

In the system shown in FIG. 2, a fiber bus extender embedment (FBEE) 201 is advantageously provided to facilitate direct long-distance communications (e.g. up to 1000 meters or more) between processor 206 and the remote devices 218. The FBEE will allow remote devices 218 to appear to the processor 206 as though they are locally directly connected by means of a standard electronic interface bus. Likewise, the FBEE will allow the processor 206 to appear to the remote devices 218 as though it is locally directly connected by means of a standard electronic interface bus. From the standpoint of the processor 206 and the remote device 218 the FBEE is essentially transparent.

The FBEE is comprised of transport modules 207, 213 which facilitate a moderate to high speed interface between the processor 206 and the remote devices 208. The transport module 207 is a host module which can interface directly with a processor 206 or any other device operating a standard electrical interface protocol (e.g., I2C, SPI, GPIO or others). The transport module 213 is a client module which can directly interface with one or more remote devices 218 in accordance with a standard electrical interface protocol.

The transport modules 207, 213 are each respectively comprised of one or more protocol optical transceivers (POTs) 208, 216. In each transport module, one or more wavelength division optical multiplexers (WDMUX) 210, 214 can be provided for those scenarios where two or more POTs are included in the transport module. Each POT 208, 216 is comprised of an electronic interface which is compatible with a predetermined electrical interface standard. The electrical interface standard can be any interface standard that is now known or known in the future. For example, in some scenarios. the electronic interface can be conformed to a conventional electronic interface standard such as SPI, I2C, GPIO or some other interface standard which is now known or may be known in the future.

If multiple POTs 208, 216 are included in a transport module 207, 213, then the electronic interfaces respectively included in such multiple POTs can each be configured to have electrical characteristics in accordance with the same electrical interface standard, or they can each be configured to operate in accordance with a different electrical interface standards. All pertinent signals associated with the same protocol can be encoded on the same optical fiber 112. According to one aspect, the electrical interface in one or more of the POTs is a bidirectional electronic interface which facilitates both transmit and receive operations as shown.

Each POT 208, 216 also includes one or more conversion devices which are respectively coupled to the electronic interface associated with a particular POT. The conversion devices are electro-optic and/or opto-electric conversion devices. Accordingly, at least an electro-optic (EO) one of the conversion devices can be configured to convert electrical signals into optical signals, and at least an opto-electric (OE) one of the conversion devices can be configured to convert optical signals to electrical signals. Various types of EO and OE conversion devices are well known in the art and therefore will not be described here in detail. However, it will be appreciated that an EO conversion device can include an optical modulator and an OE conversion device can include a photodiode or other type of photodetector.

Accordingly, a POT 208, 216 can receive electrical signals in accordance with a predetermined electrical interface standard. High speed photodetectors convert such signals to optical signals, and communicate and/or couple such signals to one or more optical fibers 212 for transport (e.g. transport to remote subsystem 204 or HEU 202). When received at a distant end of the optical fiber 212, a POT 208, 216 can convert such signals to a predetermined electrical interface standard and output the electrical signals. According to one aspect, the electrical interface in the POT at a receiving end of the link is advantageously configured to output electrical signals which conform to the same interface standard as those which were received at the source transport module. Accordingly, the optical interface can be made essentially transparent to the processor 206 and the remote devices 218. Proper impedance matching networks and signal level adjustments are all handled by the electrical interface to ensure that the POT is compatible with the electrical interface standard that is in use.

In scenarios where a plurality of POTs 208, 216 are provided in a particular transport module 207, 213, each POT can be configured to produce an optical output signal having a different wavelength. By using conventional wavelength division optical multiplexing techniques, these optical signals of different wavelength can be combined or multiplexed onto the same optical fiber at a source one of the POTs 202, 204 and then de-multiplexed into separate optical signals at the POT 202, 204 where the optical signal is received.

From the foregoing it will be understood that the transport module is comprised of both electronic and optical processing elements. Accordingly, each transport module 207, 213 as described herein can in some scenarios be configured as a multi-chip module (MCM) or system-in-package (SIP) module. Each POT can be comprised of a photonic integrated circuit (PIC) which is integrated in the MCM together with an electronic integrated circuit to facilitate the electronics interface. In other scenarios, Silicon photonics can be used to facilitate integration of the electronic interface and the optical components of the system on the same silicon substrate. Accordingly, an entire transport module (including the POT and WD MUX) can be an application specific integrated circuit (ASIC) provided in a single device package. The FBEE system disclosed herein will provide a relatively low-cost easy to deploy solution requiring minimal additional support circuitry so that a variety of remote devices can be directly controlled using standard electronic interface protocols. With the FBEE system as described, these remote devices and systems can appear local to a head end control device (such as processor 206). Similarly, the head end control device will appear local to the remote devices and systems.

Since different POTs 208, 216 can be configured to exhibit electrical characteristics in accordance with different predetermined types of electronic interface standards, the FBEE disclosed herein can support different electrical interfaces between different pairs of POTs 208, 216. Further, multiple devices and systems having the same or different electronic interfaces can be supported from the head end. In other words, a first pair of POTs 208, 216 could support an SPI interface, a second pair of POTs could support an I2C interface, and a third pair of POTs could support a GPIO interface. By utilizing optical multiplexing techniques, a large number of remote devices can be supported on a single fiber.

There can also be some scenarios where one or more remote devices 218 utilize a different standard electronic interface as compared to an HEU. In such scenarios, one or both POTs can be configured to further perform high-speed interface translation operations whereby electronic data signals received at a first POT in accordance with a first electronic interface standard are converted to a second electronic interface standard which is different from the first. These interface standard conversion operations can be performed at a POT 208 located at an HEU 202 or an POT 216 located at a remote subsystem. The interface translation operations can include adjustments or modifications to data format, data coding, signal levels, signal timing, message types and so on. Accordingly, it will appear to both devices as though they are communicating using the same electronic interface standard, when in fact they are not.

Figure 3:
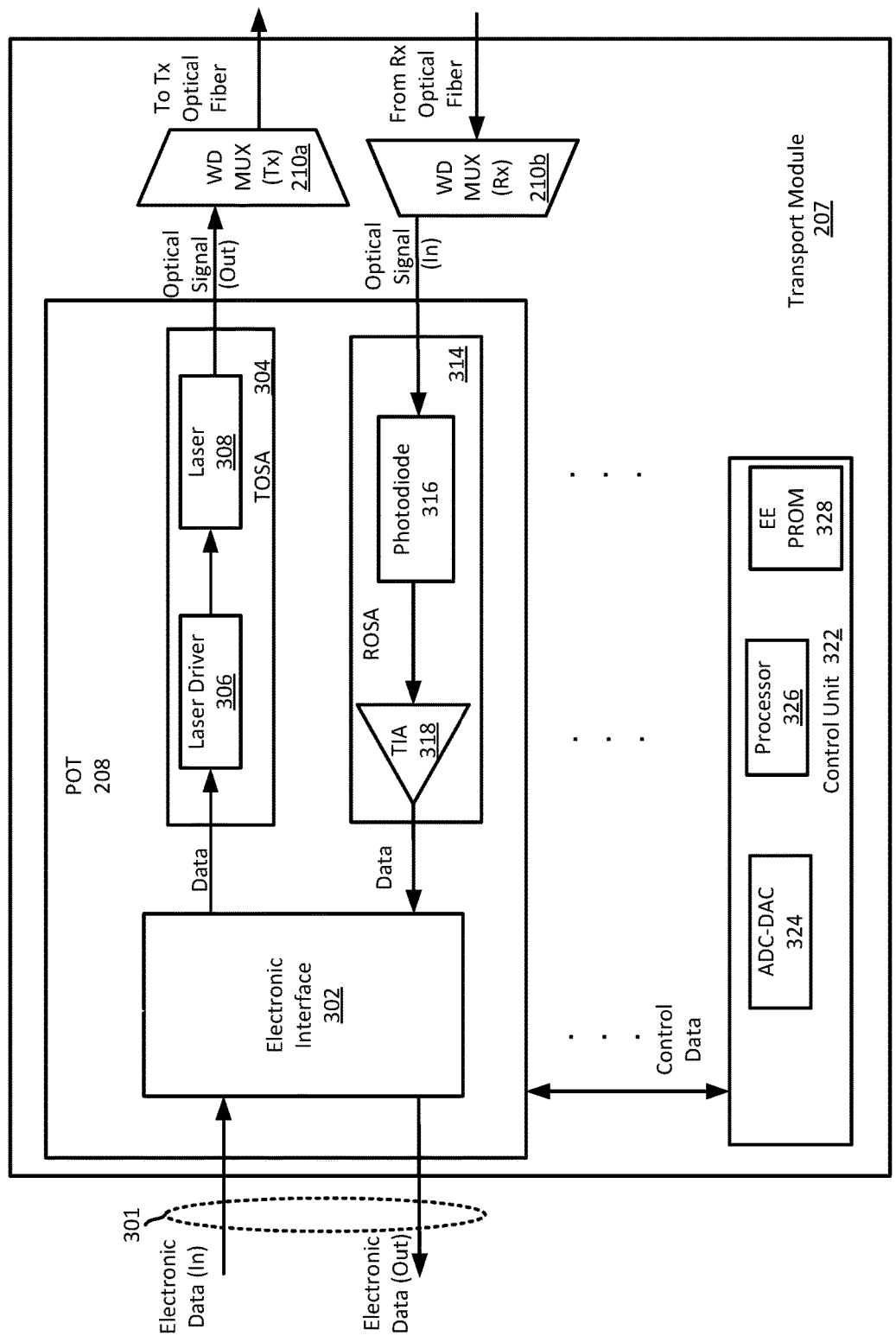
FIG. 3 is a detailed block diagram of a fiber bus extender embedment in the distributed electronic system of FIG. 2.

Turning now to FIG. 3, there is shown a more detailed block diagram of an exemplary transport module 207. Transport module 213 can have a similar configuration to transport module 207. Accordingly, FIG. 3 is sufficient for understanding both transport modules 207 and 213. Also, it may be observed in FIG. 3 that only a single POT 208 is shown. This is done to facilitate greater clarity in the drawing. However, it will be understood that each transport module can have one or more POT included therein.

As shown in FIG. 3, a POT can include an electronic interface 302, a transmit optical sub-assembly (TOSA) 304, and a receive optical sub-assembly (ROSA) 314. The electronic interface 302 is a bidirectional interface configured to conform to a predetermined interface standard 301 (e.g. SPI, I2C, GPIO). As such, the electronic interface 302 can include electronic circuitry to provide the necessary electrical characteristics which are required to facilitate receiving electronic data in accordance with a particular predetermined interface standard. Similarly, the electronic interface 302 can include electronic circuitry to provide the necessary electrical characteristics which are required to facilitate transmitting electronic data in accordance with a particular predetermined interface standard.

Figure 4:
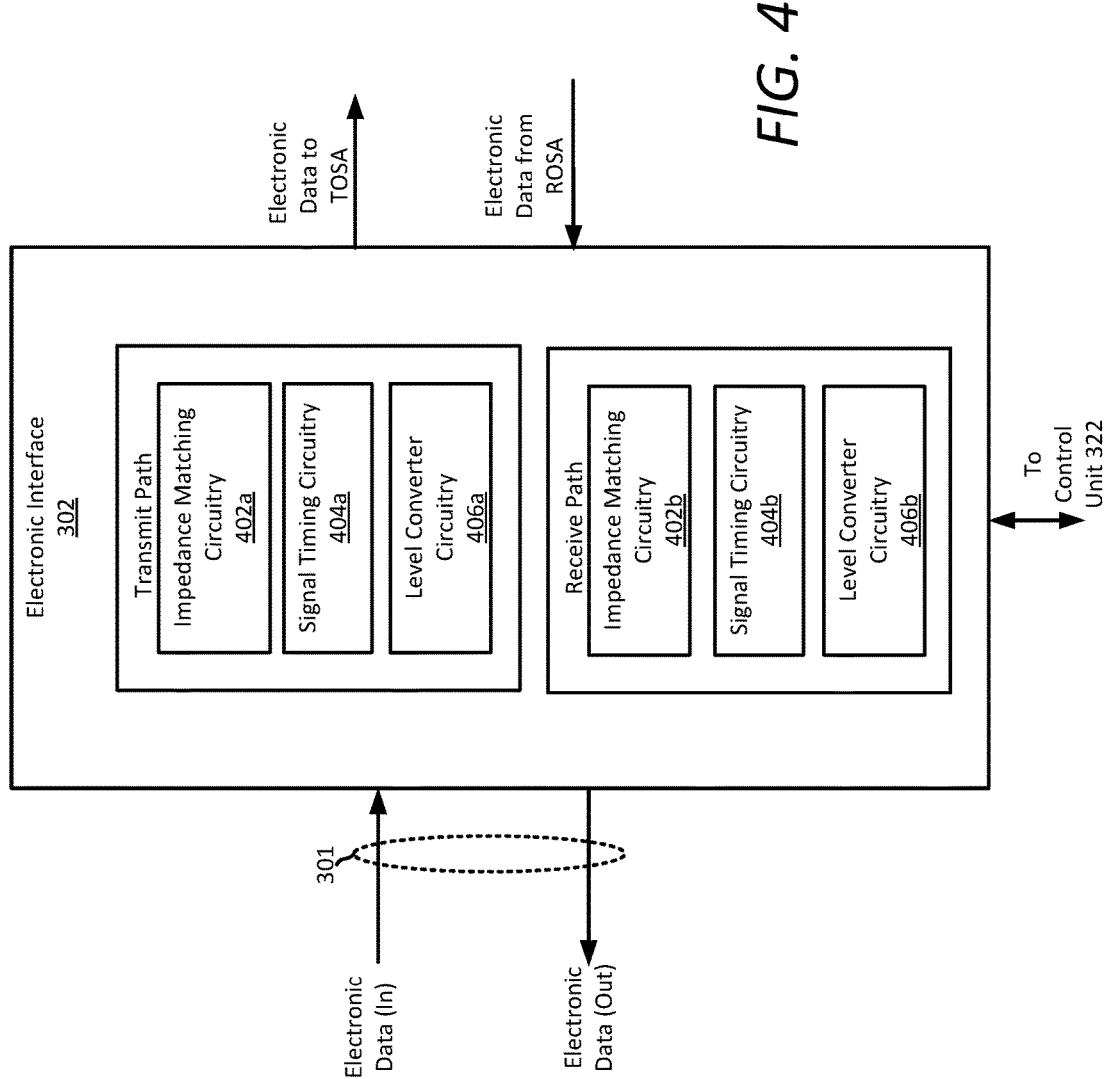
FIG. 4 is detailed block diagram of an electronic interface.

The exact nature of the electronic circuitry necessary to facilitate receiving and transmitting data in accordance with a particular interface standard will naturally depend on the particular interface standard which is being emulated. However, as shown in FIG. 4, the electronic interface 302 can include one or more of impedance matching networks 402a, 402b, timing circuitry 404a, 404b, and/or signal level converters 406a, 406b to facilitate a bidirectional electronic transceiver capable of conforming to a particular interface standard.

A TOSA is well known construct in the field of optical communications and therefore will not be described here in detail. However, it will be appreciated that a TOSA 304 is designed to convert electronic data signals into a modulated optical signal which can be coupled to an optical fiber by means of a suitable optical interface. Accordingly, a conventional TOSA 304 will include laser driver circuitry 306 which receives transmit data in an electronic format, and a laser source 308 which is responsive to the laser driver circuitry to produce a modulated optical laser output signal. Other components such as filter elements and isolators (not shown) may also be present within the TOSA 304.

A ROSA 314 is also well known construct in the field of optical communications and therefore will not be described here in detail. However, it should be understood that a ROSA 314 receives an optical signal and converts such signal to an electrical format. As such, the ROSA 314 can include a photodiode 316 for converting an optical signal to electronic format, and a transimpedance amplifier (TIA) 318 for increasing the signal output voltage of the photodiode. Other components may also be present in the ROSA but the foregoing description is sufficient for the purposes of this disclosure.

Within transport module 207, the ROSA, the TOSA and the electronic interface of a particular POT can operate under the control of a control unit 322. In some scenarios a separate control unit 322 can be provided for each POT, but in other scenarios it can be advantageous to utilize a single control unit to control multiple POTs within the same transport module. The control unit can include electronic data storage such as EE PROM 328. The electronic data storage can contain data and instructions for use by a processor 326. The processor can be a microprocessor, a microcontroller, an application specific circuit, a programmable logic device, or other circuit programmed to perform the functions described herein. The control unit can also include an analog-to-digital converter (ADC) and a digital-to-analog converter (DAC) (collectively ADC/DAC) 324 to facilitate monitoring and control operations with respect to the ROSA and TOSA. For example, it is known in the field of optical transceivers that these components can be used to control and/or monitor voltage bias levels applied to certain components, such as the laser and photodiode.

The electronic interface 302 can receive and transmit electronic data in accordance with a predetermined interface standard. After performing any necessary signal level adjustments to received electronic data, the electronic interface 302 will communicate such information to TOSA 304 which converts the electrical data signal from the interface to a modulated optical signal. More particularly, the electronic signal received at the interface is used (directly or after signal conditioning) to modulate an optical signal. The modulated optical signal is output from the TOSA 304 to a transmit WD MUX 210a. The WD MUX 210a can combine similar types of modulated optical signals of different optical wavelengths provided from one or more other POTs 208 in the transport module 207. The combined modulated optical signals from the WD MUX can then be communicated or coupled to an optical fiber for transmission (e.g., transmission to remote subsystem 204).

Similar operations can be performed at a transport module 213 resulting in a combined modulated optical signal that is communicated to the transport module 207. When such combined modulated optical signal is received it is coupled from an optical fiber to WD MUX 210b. If more than one modulated optical signal of different wavelength is present, the WD MUX 210b will route each modulated optical signal of a particular wavelength to a ROSA 314 of a predetermined POT 208. There, the modulated optical signal will be converted to an electronic data signal by a photodetector (e.g., photodiode 316). The demodulated electronic data signal can then be communicated to a suitable amplifier, such as transimpedance amplifier (TIA) 318 to boost its signal level.

The output of the TIA 318 is coupled to the electronic interface 302 as shown. The electronic interface 302 is configured to perform operations on the electronic data received from the ROSA so that the data is conformed to the requirements of the predetermined interface standard (e.g. SPI, I2C, GPIO). As such, the electronic interface 302 can include electronic circuitry to provide the necessary electrical characteristics which are required to facilitate transmitting electronic data in accordance with a particular predetermined interface standard.

Figure 5:
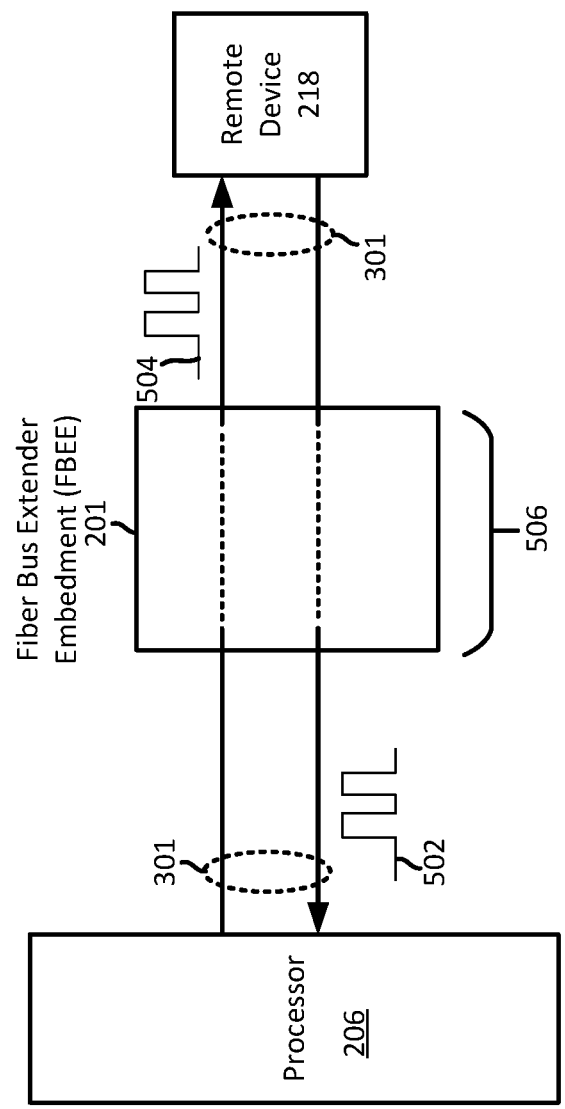
FIG. 5 is conceptual block diagram that is useful for understanding how the presence of an FBEE is transparent to first and second devices communicating over an electronic data link.

With the solution described herein, the result shown in FIG. 5 is obtained, whereby a processor 206 can communicate over large distances with one or more remote devices 218. Each of the processor 206 and the remote devices 218 can communicate data 502, 504 over an electronic data interface having electrical characteristics conforming to a predetermined electronic interface standard 301. A usable distance of the electronic data communication link is extended by interposing an FBEE 201 at an embedment location 506 along the path of the electronic data communication link. The embedment location is intermediate of the first and second electronic device as shown. The transport modules and optical communication link of the FBEE 201 allow it to appear to each of these devices 206, 218 as though they are communicating directly with each other, with minimal latency. However, the devices can in fact be widely separated and the large distances between the devices is actually traversed using the optical fiber link.

The solution disclosed herein allows for large distances to separate devices that require real time continuous communications with little or no latency. The transport modules provide direct optical connections to commercial off-the-shelf processors and remote devices which are otherwise only configured to communicate by means of a conventional electronic interface standard. Accordingly, cost and complexity are reduced at the HEU and at the remote devices. The approach allows for near real-time performance, only limited by the inherent delays determined by the length of the optical fiber and the speed of light down the fiber path. A further advantage of the system disclosed herein is that it facilitates communications with multiple remote slave devices, which may be all at the same location or at different locations. Each POT 208 can be configured to support the same or a different interface standard. Accordingly, a single set of transport modules 207, 213 can facilitate concurrent communications with multiple different remote devices using a plurality of different interface standards.

The solution is applicable in any scenario where low-cost distributed subsystems require real-time communications with low latency and moderate to high bandwidth capability. For example, the system can be applied for controlling components of a remote antenna array, in building sensor networks, automotive interconnects, and security-centric devices where the system requires physical separation of the master device from remote slave devices. The solution also facilitates signaling bandwidths that are significantly greater than those which are currently possible over similar distances using existing interface standards.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

I claim:

1. A method for extending a communication distance range of an electronic data interface, comprising:
   establishing a data communicating link between a first electronic device and a second electronic device in accordance with a predetermined electronic interface standard (PEIS);
   interposing an optical fiber bus extender embedment (FBEE) at an embedment location along a data communication path of the data communication link, said embedment location intermediate of the first and second electronic device;
   using a first and second transport module, respectively disposed proximate to the first and second electronic device to interface the FBEE directly with both of the first and second electronic device;
   at the first transport module using a first electronic data signal received from the first electronic device to modulate a first optical signal so as to form a first modulated optical data signal (MODS);
   coupling the first MODS to an optical fiber to communicate the first MODS to the second transport module;
   establishing a second data communicating link between a third electronic device and a fourth electronic device in accordance with a second PEIS, the third and fourth electronic devices respectively disposed proximate to the first and second transport module;
   at the first transport module using a second electronic data signal received from the third electronic device to modulate a second optical signal so as to form a second modulated optical data signal (MODS);
   optically multiplexing the second MODS with the first MODS on the optical fiber to facilitate communicating the second MODS to the second transport module; and
   whereby the FBEE facilitates a communication distance between the first and second transport module which exceeds a first usable distance of the data communication link determined in accordance with the PEIS and a second usable distance of the second data communication link determined in accordance with the second PEIS.

2. The method according to claim 1, further comprising demodulating the first MODS at the second transport module to recover the first electronic data signal and demodulating the second MODS at the second transport module to recover the second electronic data signal.

3. The method according to claim 2, further comprising communicating the first electronic data signal which has been recovered to the second electronic device, and communicating the second electronic data signal which has been recovered to the fourth electronic device.

4. The method according to claim 3, wherein the first electronic data signal which has been recovered is communicated to the second electronic device in accordance with the PEIS, and wherein the second electronic data signal which has been recovered is communicated to the fourth electronic device in accordance with the second PEIS.

5. The method according to claim 3, further comprising at the second transport module using a third electronic data signal received from the second electronic device to modulate a third optical signal so as to form a third MODS.

6. The method according to claim 5, further comprising coupling the third MODS to a second optical fiber to communicate the third MODS to the first transport module.

7. The method according to claim 6, further comprising demodulating the third MODS at the first transport module to recover the third electronic data signal, and communicating the third electronic data signal which has been recovered to the first electronic device in accordance with the PEIS.

8. The method according to claim 6, further comprising selecting the first and second optical fibers to be distinct or separate optical fibers.

9. The method according to claim 3, wherein the PEIS is selected from the group consisting of Inter-Integrated Circuit (I2C) interface, Serial Peripheral Interface (SPI), and a GPIO interface.

10. The method according to claim 1, further comprising de-multiplexing and demodulating the second MODS at the second transport module to recover the second electronic data signal.

11. A physically distributed system, comprising:
a first electronic device and a second electronic device configured to communicate with each other over a data communication link in accordance with a predetermined electronic interface standard (PEIS);
a fiber bus extender embedment (FBEE) including a first and a second transport module respectively disposed proximate to the first and second electronic device and configured to interface the FBEE directly with both of the first and second electronic device;
a third electronic device and a fourth electronic device respectively disposed proximate to the first and second transport module, and configured to communicate with each other over a second data communication link in accordance with a second PEIS;
wherein the first transport module is configured to
receive a first electronic data signal in accordance with the PEIS from the first electronic device;
using the first electronic data signal received from the first electronic device to modulate a first optical signal so as to form a first modulated optical data signal (MODS);
receive a second electronic data signal in accordance with the second PEIS from the third electronic device;
using the second electronic data signal to modulate a second optical signal so as to form a second MODS;
couple the first MODS to an optical fiber to communicate the first MODS to the second transport module; and
optically multiplex the second MODS with the first MODS on the optical fiber to facilitate communicating the second MODS to the second transport module;
whereby the FBEE facilitates a communication distance between the first and second transport module which exceeds a first usable distance of the data communication link determined in accordance with the PEIS, and a second usable distance of the second data communication link determined in accordance with the second PEIS.

12. The physically distributed system according to claim 11, wherein the second transport module is configured to demodulate the first MODS to recover the first electronic data signal and demodulate the second MODS to recover the second electronic data signal.

13. The physically distributed system according to claim 12, wherein the second transport module is configured to communicate the first electronic data signal which has been recovered to the second electronic device, and communicate the second electronic data signal which has been recovered to the fourth electronic device.

14. The physically distributed system according to claim 13, wherein the second transport module is configured to communicate the first electronic data signal which has been recovered to the second electronic device in accordance with the PEIS, and communicate the second electronic data signal which has been recovered to the fourth electronic device in accordance with the second PEIS.

15. The physically distributed system according to claim 13, wherein the second transport module is configured to use a third electronic data signal received from the second electronic device to modulate a third optical signal so as to form a third MODS.

16. The physically distributed system according to claim 15, wherein the second transport module is configured to couple the third MODS to a second optical fiber to communicate the third MODS to the first transport module.

17. The physically distributed system according to claim 16, wherein the first transport module is configured to demodulate the third MODS to recover the third electronic data signal, and communicate the third electronic data signal which has been recovered to the first electronic device in accordance with the PEIS.

18. The physically distributed system according to claim 16, wherein the first and second optical fibers are separate optical fibers.

19. The physically distributed system according to claim 13, wherein the PEIS is selected from the group consisting of Inter-Integrated Circuit (I2C) interface, Serial Peripheral Interface (SPI), and a GPIO interface.

* * * * *